April 20, 1954 — A. E. SLOAN — 2,676,021
EDUCATIONAL PUZZLE
Filed Dec. 13, 1950

Inventor
Allan Edward Sloan,
By Schrader, Merriam,
Hofgren & Brady, Attys.

Patented Apr. 20, 1954

2,676,021

UNITED STATES PATENT OFFICE 2,676,021

EDUCATIONAL PUZZLE

Allan Edward Sloan, Woodstock, N. Y.

Application December 13, 1950, Serial No. 200,545

1 Claim. (Cl. 273—157)

This invention relates to a puzzle and more particularly to an educational form of puzzle.

The general purpose of this invention is to provide a puzzle or game which is to be solved or played by children of tender age and which not only provides amusement but also has been found to be extremely effective in teaching such children certain facts relating to natural objects.

The principal feature of this invention is the provision of a picture showing an object, for example a piece of fruit, in the stage it may exist immediately before being eaten and to provide irregularly shaped pieces which may be fitted together to form the natural overlying covering for the object. Thus, for example, the picture may be of an ear of corn completely husked and thus in the form in which it is normally presented to the child for eating. The irregular pieces which are adapted to be fitted together are colored to represent the husk of the corn and when fitted together over the ear of corn show it in its natural state. Thus the child is able to associate an unhusked ear of corn on a cornstalk or in a vegetable stand with the husked ear of corn which he finds on the table at mealtime.

As another application of the invention there might be depicted a full glass of orange juice and alongside the glass an orange sliced in two. The overlying parts which are adapted to be matched together when matched over the glass show it as empty while showing the orange as a whole object. Thus the child learns that the orange shaped spherical object which he sees in the store may be sliced and then used to produce a full glass of orange juice.

It has been interesting to learn that normally children do not associate the object in its natural state with its condition immediately prior to being eaten. This should not be surprising inasmuch as there is a rather large difference in appearance between a husked and unhusked ear of corn, for example.

Other natural objects may be used as the basis for the puzzle, for example peas in a pod. Thus the puzzle may show a number of peas and the irregularly shaped pieces which are positioned thereover may be in the form of a pod covering the peas. Again it should be pointed out that the appearance of pea pods bear little or no resemblance to the peas found on the child's plate at dinner time. However, if the child had previously played with the device of this invention in the form just described he would be aware of the fact that peas do not normally come separate but rather come in a casing called a pod.

For the purpose of illustrating the invention a single embodiment has been chosen, namely an apple.

Figure 2:
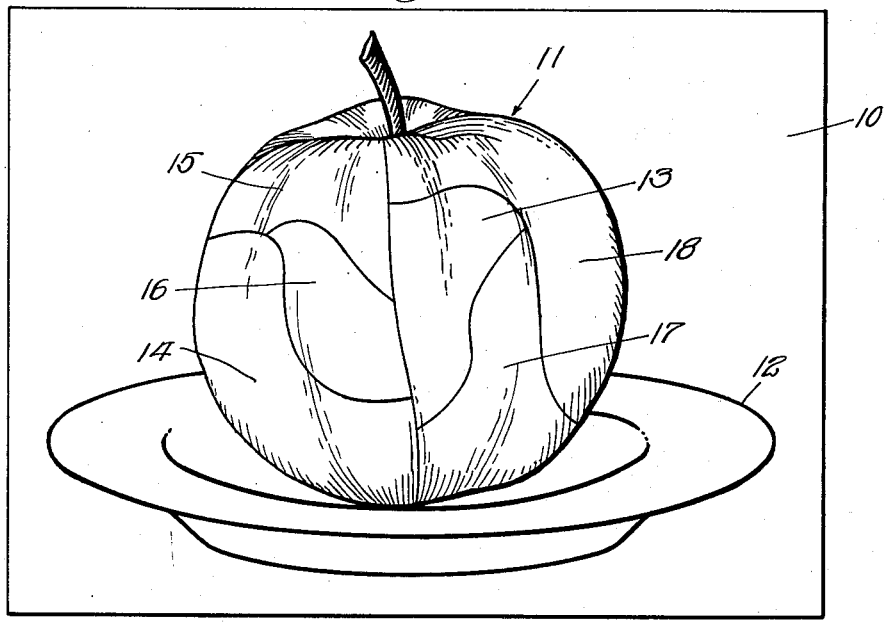
Figure 1:
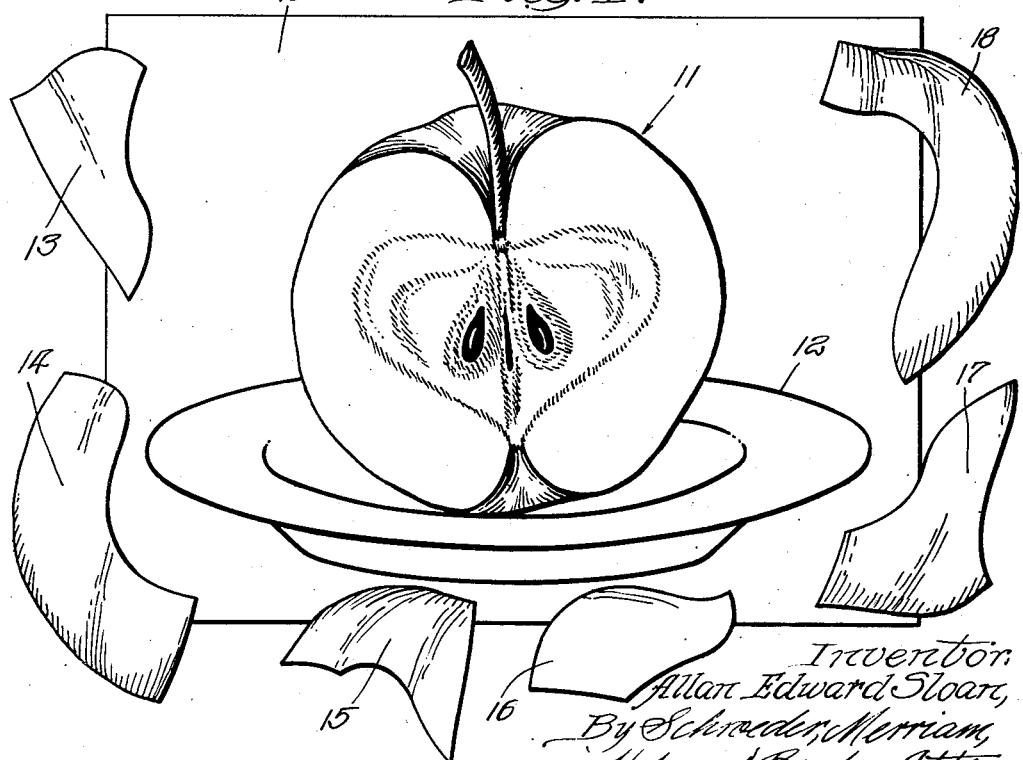

In the drawings, Fig. 1 shows the puzzle of this invention with the various parts unassembled; and Fig. 2 is a view similar to Fig. 1 with the parts assembled.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claim.

Referring now to Fig. 1 of the drawings, there is shown a support in the form of a sheet of heavy board 10 upon which there is painted in full color an apple 11. As previously indicated, the apple is shown in condition for eating, in this particular case cut in half. The apple is pictured as resting upon a plate 12 in a manner similar to which it would normally be served to a child.

Also shown in Fig. 1 are the irregularly shaped pieces 13 to 18 which are adapted to be assembled together to form the overlying skin of the apple. The irregularly shaped pieces are colored to depict the normal red of the apple and when properly assembled together produce the result shown in Fig. 2. As will be noted, Fig. 2 shows a complete fruit in its normal natural state. In working the puzzle the child learns that the sliced apple which he is customarily served is not the natural state of the fruit but rather it exists in nature as shown in Fig. 2.

The device of this invention is particularly adaptable to fit the abilities of children of various ages. Thus for the kindergarten age the number of pieces which must be assembled together to form the natural object may be reduced in number and so shaped as to present only a simple problem of assembly. As the ability of the child progresses, the number of pieces may be increased so as to make the game somewhat more difficult.

Obviously, many objects can be the subject of the puzzle. Not only fruits and vegetables but other things such as the interior and exterior of various mechanical objects, for example engines and the like, may be reproduced as described.

Clearly, the field of the invention is extremely broad.

I claim:

A jig-saw type puzzle comprising a substantially flat base piece, means on the base piece depicting an internal vertical sectional view of an object, and a plurality of irregularly shaped pieces separate from the base piece and each bearing on one surface thereof a picturization of a portion of the exterior of said object, said pieces being adapted to be placed over the depicted object in matching relationship to form a completed picture of the exterior of said object with each piece having an exterior picture portion corresponding to the interior picture portion which it covers, the shape of said pieces being such as to permit their being so arranged in matching relationship in only a single pattern.

References Cited in the file of this patent

UNITED STATES PATENTS

| Number | Name | Date |
|---|---|---|
| 496,257 | Gibson | Apr. 25, 1893 |
| 1,403,896 | Delaplaine | Jan. 17, 1922 |
| 1,477,322 | Degheri | Dec. 11, 1923 |
| 2,501,520 | Howard | Mar. 21, 1950 |

FOREIGN PATENTS

| Number | Country | Date |
|---|---|---|
| 419,311 | Great Britain | Nov. 9, 1934 |